United States Patent [19]

Fortune

[11] 4,456,816
[45] Jun. 26, 1984

[54] HOLDER FOR ELECTRICALLY HEATED INSTRUMENTS AND THE LIKE

[76] Inventor: William S. Fortune, 29866 Cuthbert St., Malibu, Calif. 90265

[21] Appl. No.: 237,220

[22] Filed: Feb. 23, 1981

[51] Int. Cl.$^3$ .................... B23K 3/00; F16M 11/00
[52] U.S. Cl. .................... 219/242; 219/230; 228/19; 228/57; 248/117.2
[58] Field of Search .................. 219/242, 230; 248/117.1–117.7; 228/51–57, 19, 20; 15/344

[56] References Cited

U.S. PATENT DOCUMENTS

| | | | |
|---|---|---|---|
| 1,786,065 | 12/1930 | Heimberger et al. | 219/242 X |
| 2,174,230 | 9/1939 | Shangle | 219/242 X |
| 3,294,348 | 12/1966 | Cerisano | 219/242 X |
| 3,883,716 | 5/1975 | Fortune | 219/242 X |
| 3,990,623 | 11/1976 | Fortune | 219/242 X |
| 4,176,778 | 12/1979 | Fortune | 219/242 X |
| 4,221,017 | 9/1980 | Fortune | 15/344 |

FOREIGN PATENT DOCUMENTS 133414 1/1979 German Democratic Rep. ... 228/51

*Primary Examiner*—A. Bartis

[57] ABSTRACT

A holder for electrically heated temperature controlled soldering instruments includes a hollow housing having a forward portion for sealingly engaging the handle shoulder of the soldering instrument. The forward end of the housing is so arranged that the handle end of the instrument is higher than the tip with the instrument held downwardly at an angle with respect to the central axis of the housing. A hollow cone having an inner heat-reflecting surface is disposed in the housing about the tip. The housing and cone may be evacuated to reduce heat losses. A locking element is pivoted to the forward end of the housing and biased into its closed position to lock the instrument in the holder. The locking element is so designed that the instrument pushes the element into its open position upon insertion. The locking element opens when the operator pulls the instrument out with his finger adjacent the forward end of the housing. The holder includes means on its top for securing thereto another tool. A sponge tray secured to the holder includes a low input water supply nipple and a high output water removal nipple. The holder includes an open-ended slotted cylinder for supporting a solder spool and a solder wick spool.

7 Claims, 9 Drawing Figures

HOLDER FOR ELECTRICALLY HEATED INSTRUMENTS AND THE LIKE

BACKGROUND OF THE INVENTION

This invention relates generally to a holder for soldering instruments and particularly, but not exclusively, to holders for temperature-controlled soldering instruments.

The present invention may be considered to be an improvement over the applicant's prior U.S. Pat. Nos. 3,990,623 and 4,176,778.

The tool holder of the present invention is particularly useful for temperature-controlled soldering instruments of the type disclosed and claimed in applicant's prior U.S. Pat. No. 3,883,716. In this case it is particularly desirable to maintain the soldering instrument so that heat losses are minimized. To this end, it is desirable to enclose the soldering instrument to minimize both reflective and conductive heat losses.

The holder of the invention also includes an improved means for housing a solder spool, as well as one or more solder braid spools. Additionally, it may be desirable to provide a sponge tray so that it may readily be removed from the remainder of the instrument.

SUMMARY OF THE INVENTION

In accordance with the present invention, there is provided a holder primarily intended for an electronically temperature-controlled soldering instrument. The instrument is of the type including an enlarged diameter shoulder about the periphery of its forward end and a working shaft extending axially forwardly therefrom and terminating in the heated tip element.

The holder itself includes a hollow housing having a forward end for sealingly engaging the shoulder of the instrument. The forward end of the housing is disposed higher than its rearward end. Additionally, the forward end of the housing has means for holding the instrument downwardly and at an angle with respect to the central axis of the housing.

A hollow cone having an inner heat-reflecting surface is disposed in the housing for receiving the working shaft and tip element. The hollow cone will reflect heat energy and will cause the working shaft and tip to assume a substantially uniform temperature without any hot spots. The cone may be omitted for use with an electrically heated soldering instrument that is not temperature-controlled.

Finally, release and locking means are pivoted to the forward end of the housing and biased by spring means into a closed position. The locking means has a forward portion permitting the shoulder of the instrument to push the locking means to its open position when the instrument is pushed into the housing. The locking means has a finger-actuable portion for releasing the instrument when the operator holds the instrument adjacent to its shoulder, thereby permitting easy withdrawal of the instrument.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
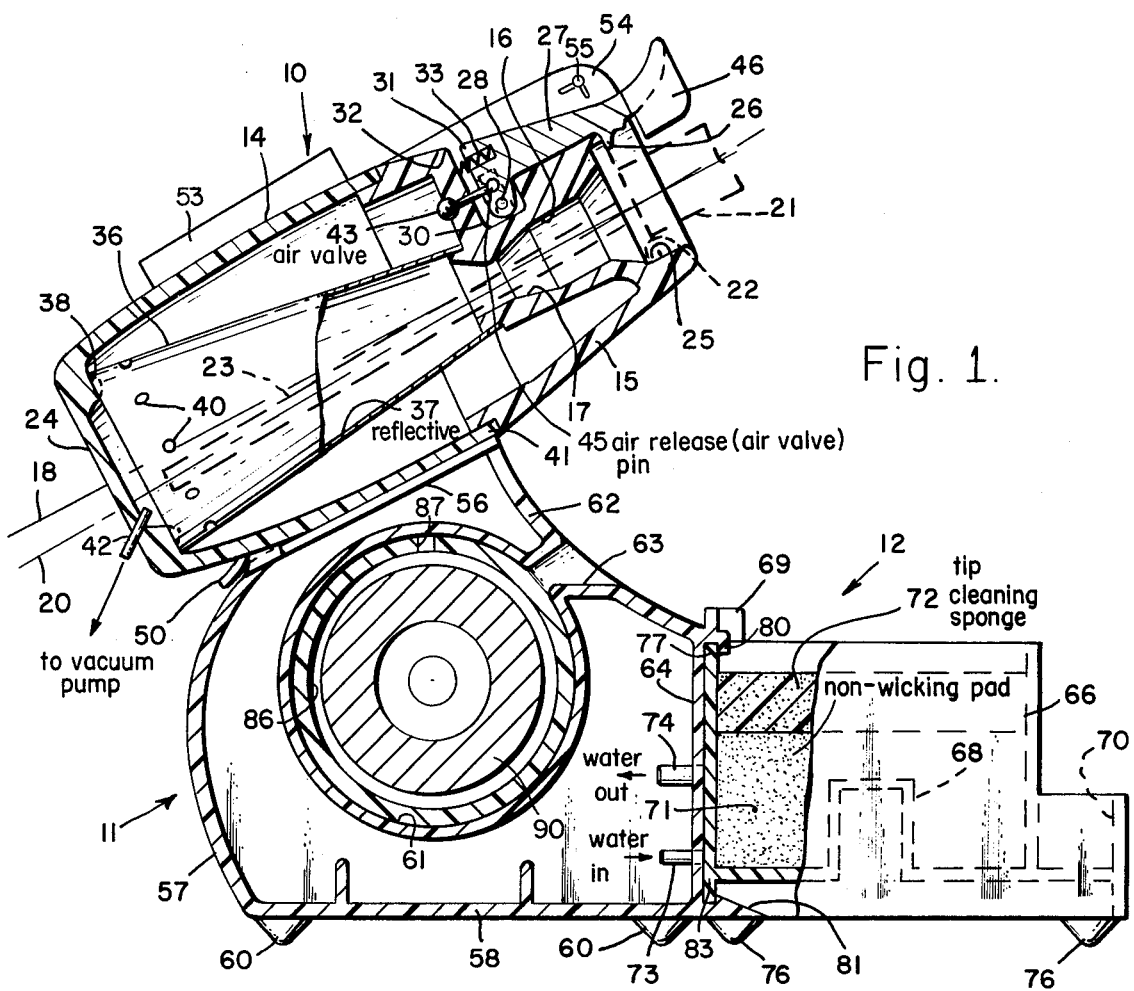
FIG. 1 is a side elevational view partly in cross section of the holder of the invention, including the support for the holder and a sponge tray.

Referring now to the drawings and particularly to FIGS. 1 through 7, there is illustrated by way of example a preferred embodiment of the present invention. As shown particularly in FIG. 1, the holder of the present invention includes primarily a tool pod assembly 10, a support and solder strand base 11, and a sponge tray 12. The tool pod holder 10 consists of a hollow housing or tool pod holder 14 and a front portion 15 for receiving a soldering instrument. The soldering instrument may be of the type disclosed and claimed in the applicant's prior U.S. Pat. No. 3,883,716, above referred to. The tool pod holder is illustrated particularly in FIGS. 1, 4, and 5. As shown in FIG. 1, the housing front end 15 has an upper inner surface 16 and a lower inner surface 17 which are so shaped and arranged that a soldering instrument can be guided thereby, and which form an angle with the central housing axis 18 and the central tool axis 20, thereby to dispose the instrument downwardly of the housing 14.

The tool pod is generally inclined downwardly to facilitate insertion of the instrument by the operator. The instrument is further inclined downwardly within the tool pod to direct heat away from the top, to minimize heating of the upper surface of the housing 14, and thereby to present a cool surface to the operator.

The instrument, as shown on dotted lines, includes a handle 21, a radially extending shoulder 22 having an enlarged diameter, and a working shaft 23 which, in turn, terminates conventionally in a heated tip.

The shoulder 22 of the soldering instrument rests on a recess 25 disposed in the lower end of the housing front portion 15. It is locked in by a projection 26 provided on a pivoted locking element 27. The locking element 27 has its pivot at 28. The position of the pivot 28 is somewhat critical, and as illustrated is at the lower end of an L-shaped extrusion 30. The pivot 28 is in line with the projection 26 to grip tool when the instrument is accidentally pulled back. The locking element 27 is biased by a spring 31 resting against a flat surface 32 of the housing 14 and extending into a cylindrical recess 33 in the locking element 27. The locking element 27 rests on the outer surface of the housing portion 15.

It will be understood that the inner surfaces 16 and 17 of the housing front portion form a guide for the soldering instrument.

In accordance with the present invention, the housing 14 is provided with means for substantially decreasing the heat loss of the soldering instrument. To this end there is disposed a cone 36 consisting of a suitable material such as a metal having an inner surface 37 which is highly heat reflecting. The metal of the cone 36 may, for example, consist of aluminum, silver, or copper, having a highly polished inner surface 37, aluminum being the preferred material. The cone 36 may be secured to the rear surface 38 of the housing 14 and may, for example, be provided with a plurality of holes or apertures 40 to provide for air circulation.

Thus, the heat-reflecting cone 36 serves the purpose to conserve energy by reducing heat dissipation by radiation. It also tends to distribute the temperature more evenly, and thus prevents a hot spot from forming. It should be noted that the narrow end of the cone 36 faces the front of the holder.

The energy loss of the soldering instrument may further be reduced by evacuating the housing 10. To this end the front portion 15 of the housing 10 may be connected to the main housing portion 14 by a bayonet connection, as shown at 41. The radial shoulder 22 of the soldering instrument provides a substantially airtight seal with the housing front portion 15. A tube 42 extends from the housing 14 and may be connected to a vacuum pump. The housing is further provided with an air valve 43 disposed in the main housing 14 and an air release pin 45 in the locking element 27. Accordingly, when the locking element 27 is pulled upwardly by its finger release 46, the locking element rotates about its pivot 28. This will move the air release pin 45 upwardly, thus releasing the valve 43 from its seat. This, in turn, will permit air to enter the housing 15 through the space between the valve 43 and its seat.

It will be understood, however, that it may not be necessary to use the heat-reflecting cone 36, nor may it be desired to evacuate the housing 14. This is particularly so when the electric soldering iron is not electrically temperature-controlled, because in that case the temperature of the soldering tip may rise too fast and exceed the desired value. In that case it may be desired to provide the housing 14 with a plurality of holes or apertures to permit the hot air inside the housing 14 to escape.

The housing 14 may also be provided with a hook or other suitable means 50 for securing thereto, for example by wrapping, a soldering tool line cord. This will facilitate removal of the tool pod 14, 15 from its support 11 by wrapping the electric cord of the instrument about the tool pod.

Figure 4:
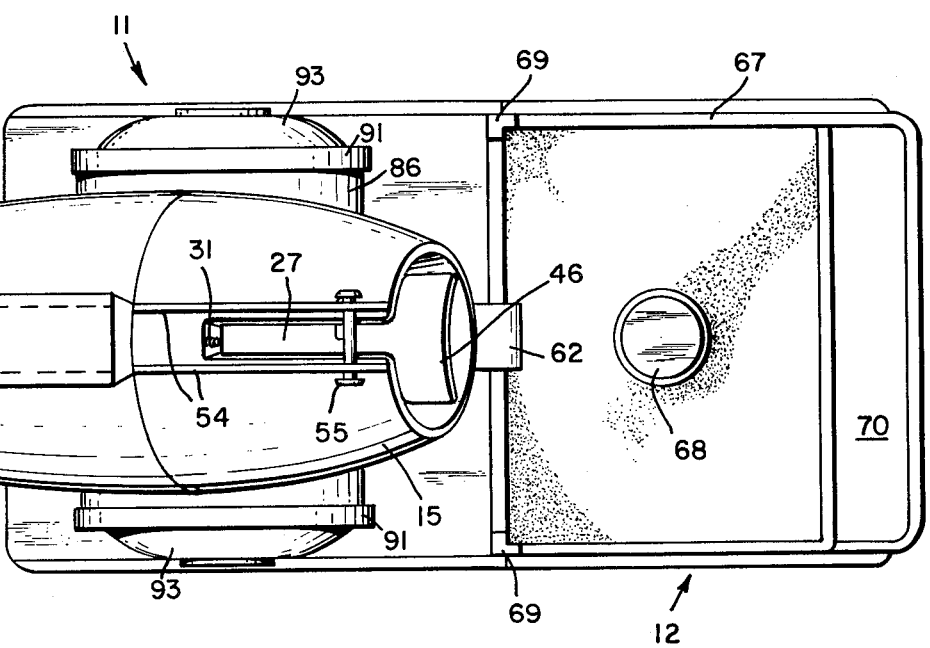
FIG. 4 is a top plan view of the holder including the pod.
Figure 5:
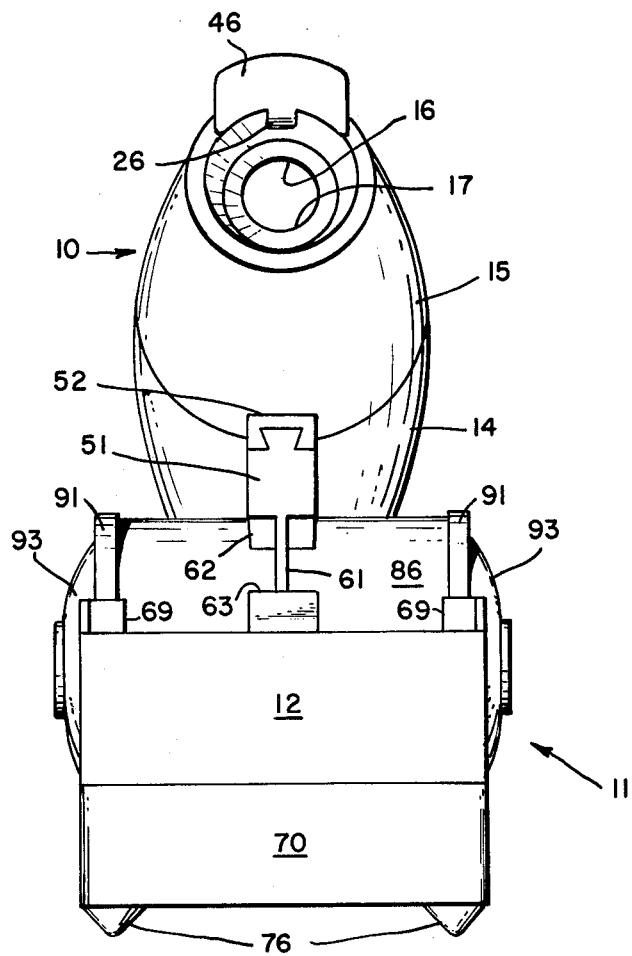
FIG. 5 is a front elevational view of the holder of FIG. 1 and illustrating particularly the dovetails between the pod and its support.

As shown particularly in FIG. 5, the support 11 and solder strand holder preferably are releasably secured to the housing 14 by a dovetail connection including a male dovetail 51 secured to the support 11 and a female dovetail 52 on the lower surface of the housing or pod 14. Similarly, as shown in FIG. 4, the top of the tool pod 10; that is, the top of the housing 14, may be provided with another female dovetail 53, or some other means such as a platform, for connecting thereto some other desired tool.

The front housing portion 15 is provided at its top with a pair of parallel upwardly-extending ridges 54. Extending through the ridges 54 is a lock pin 55 which serves the purpose to lock the locking element 27 so that the soldering instrument cannot be removed without removing the locking pin 55.

Figure 2:
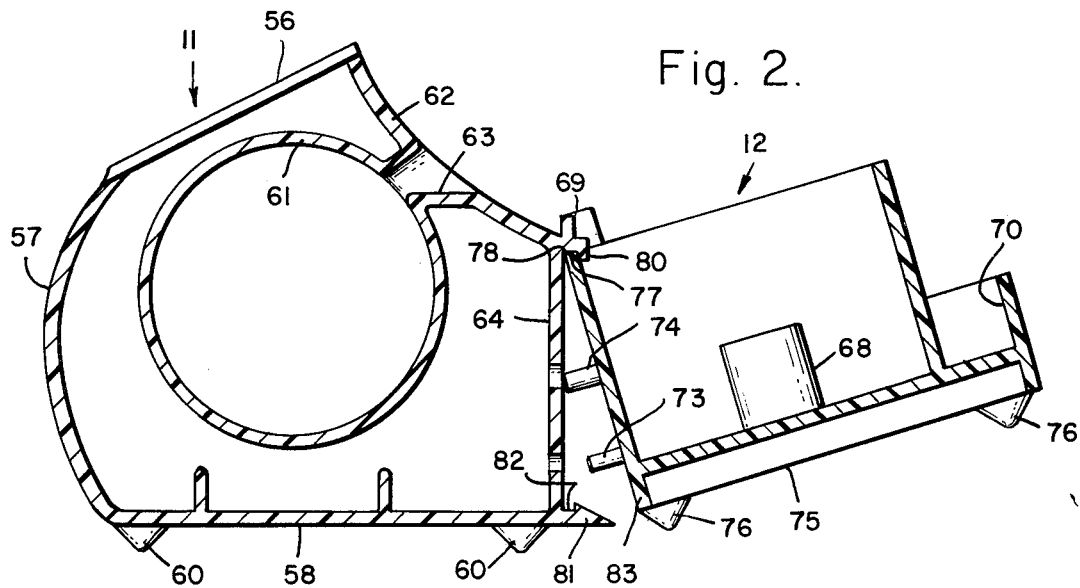
FIG. 2 is a side elevational view of the base or support of the holder, illustrating how the sponge tray may be removed from the remainder of the holder support.
Figure 1A:
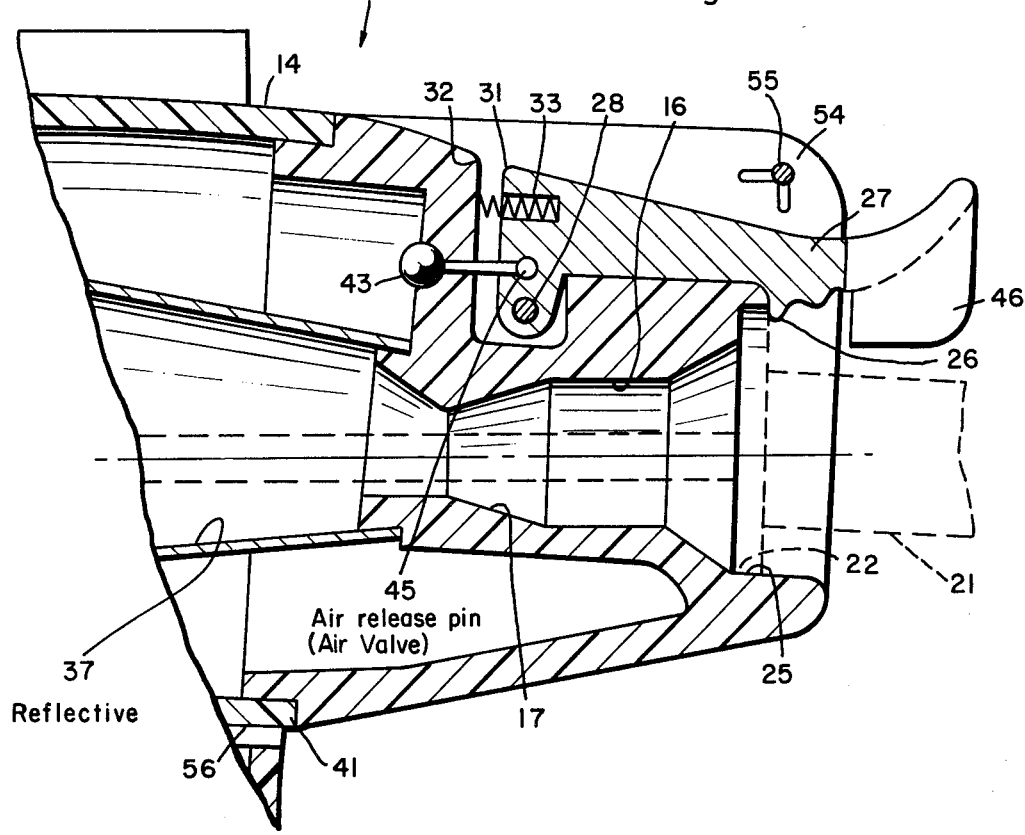
FIG. 1a is an enlarged view of a portion of FIG. 1 to illustrate the air valve and air release pin which are used to release the vacuum in the housing after an instrument has been inserted.
Figure 3:
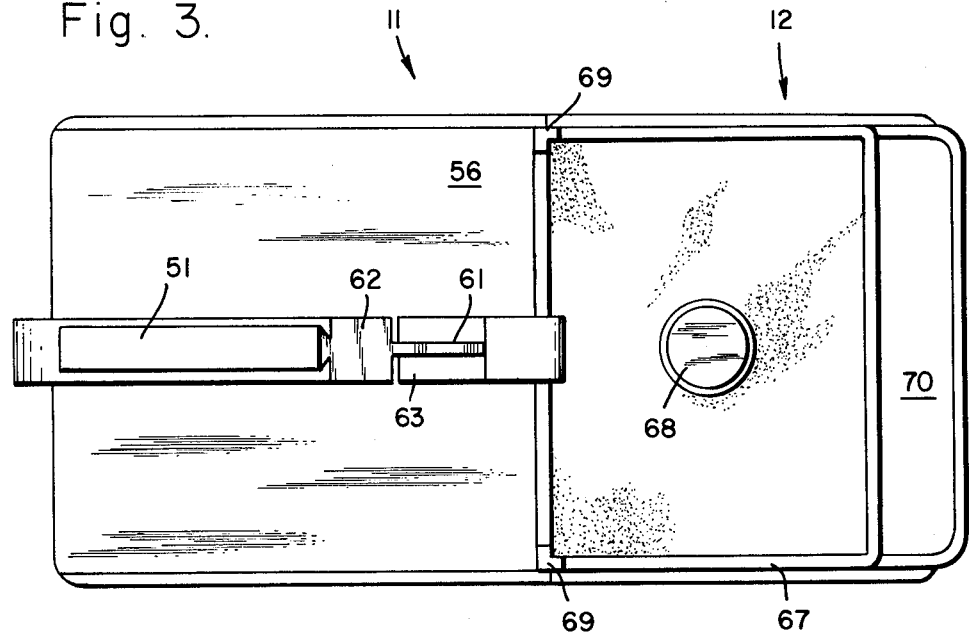
FIG. 3 is a top plan view of the holder support without the housing or pod thereof.

Turning now to the housing support 11 and soldering strand support as shown particularly in FIGS. 1 and 2, it will be noted that the support 11 has an upper surface 56 which is slanted downwardly and rearwardly so as to support the tool pod 10 so that its front end is substantially higher than its rear end. This will facilitate supporting the instrument and making sure that it is safely housed in the pod 10.

The support 11 has an outer framework 57 having a horizontal bottom portion 58 with at least one support foot 60. It is further provided with an open cylinder 61 forming a rib for supporting a solder spool holder, as will subsequently be explained. The support 11 is made as lightweight as possible by the provision of open portions, as will readily be seen in FIGS. 1 and 2. Further, the support 11 has a curved front portion 62 which is open at 63. Finally, it is provided with a side wall 64.

The support 11 is intended to house or support a soldering strand spool, as well as one or more solder wick strands, as will subsequently be explained.

The sponge tray 12 is illustrated in FIGS. 1, 2, and 4. It consists of a hollow structure 66 having an open top and a ledge 67 extending thereabout. In the interior of the sponge tray 12 there is a hollow cylinder or extrusion 68 open toward the bottom for connecting it, for example, to a work table by a commercially available expandable nut and bolt, usually called a well nut. The sponge tray 12 may also be provided with a separate compartment 70 for holding accessories such as soldering tips and the like. A pair of posts 69 may be provided at the rearward corner of the sponge tray 12. The solder strand may be wrapped about one of the posts 69.

Within the sponge tray 12 there is provided a non-wicking pad 71 provided with a central cylindrical opening to pass over the cylindrical extrusion 68. The non-wicking pad 71 has large openings within its structure to permit water to freely circulate therethrough. On top of the non-wicking pad 71 there is disposed a tip-cleaning sponge 72 for cleaning the tip of the soldering instrument. In order to remove impurities and solder that are wiped off the sponge 72, water may be circulated through the sponge tray 12, the water entering through a lower nipple 73 and leaving the tray through an upper nipple 74, to flush out impurities and other dirt.

The lower surface 75 of the tray 12 may be provided with suitable feet or supports 76.

It may also be desirable to remove the sponge tray 12. To this end, the upper portion of the tray 12 may have a protruding portion 77 which may be inserted into a short recess 78 formed by the front wall 64 of the support 11 and a small protrusion 80. Also, the support 11 is provided with a triangular and downwardly sloping flexible end portion 81 forming a small recess 82, into which locks the lower part 83 of the sponge tray 12. This is shown particularly in FIG. 2, where the sponge tray is partly removed from the support 11. After the sponge tray 12 has been connected to the support 11 it can be removed again by means of a screwdriver inserted between the end portion 81 and the sponge tray 12.

The operation of the holder of the invention will now be apparent. The soldering instrument is simply pushed into the tool pod holder 10. Its guiding surfaces 16 and 17 cause the working shaft and heated tip to be positioned downwardly of the pod 10. The triggered locking element 27 will lock the instrument so it cannot be accidentally withdrawn. In the case of an electronically temperature-controlled soldering instrument, the heat-reflective cone 36 reflects the heat of the hot tip. It also insures that the housing 14 remains cool to the touch of the operator. Finally, the air is evacuated through the tube 42.

When it is desired to remove the instrument, the operator will grip the handle portion 21 close to the finger release 46 which will raise the finger release 46 and hence the locking element 27, thereby permitting easy withdrawal of the instrument.

In case the electric soldering instrument is not temperature controlled, there is no need to evacuate the housing 14, 15. Also, the heat-reflecting cone 36 may be omitted and, instead, openings 47 may be provided in the housing 14 to permit the circulation of air.

Figure 6:
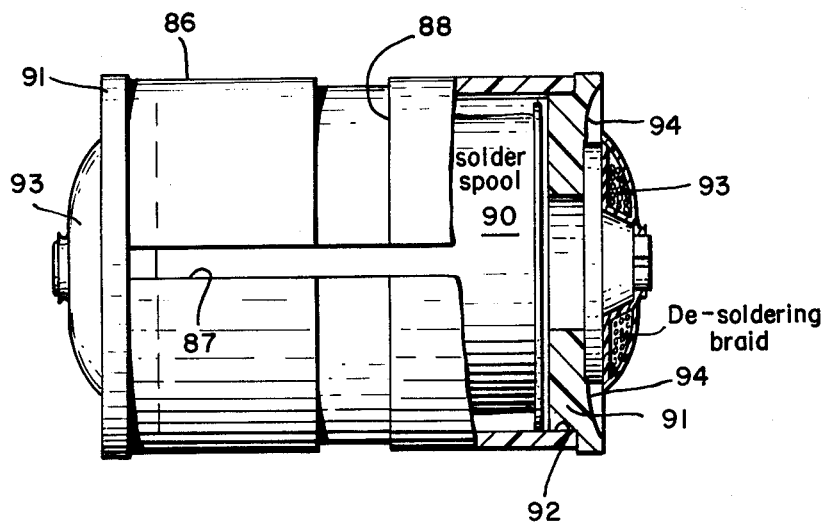
FIG. 6 is a top plan view of the solder spool holder and wick spool holder, shown partly in cross section.

Further, in accordance with the present invention, there is provided a cylinder 86, shown particularly in FIG. 6. The cylinder 86 is made of a somewhat springy material and is provided with a slot 87 extending therethrough. Furthermore, the cylinder 86 has a central recess 88. Hence, by compressing the cylinder 86, it may be pushed through the circular rib 61 of the support 11 and its recess 88 seats in the cylindrical rib 61.

The cylinder 86 may again be removed by compressing it and withdrawing it.

Disposed within the cylinder 86 there may be a solder strand spool 90. The solder may be removed through the slit 87 in the cylinder 86. It may be secured to a post 69 on the sponge tray 11. This is to minimize contact of the operator with the solder, which contains some lead and hence is somewhat poisonous.

Figure 7:
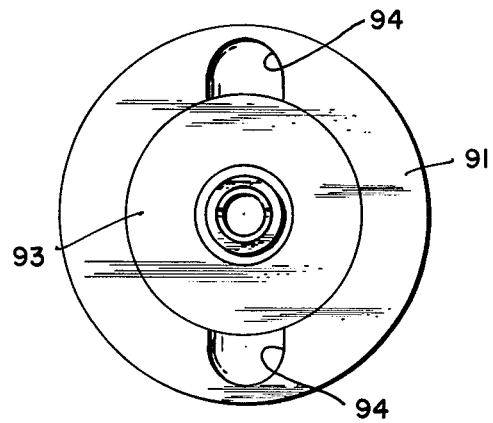
FIG. 7 is an elevational view of the side of the spool holder of FIG. 6 without the wick holder thereof.

The cylinder 86 may be expanded and maintained in that position by end caps 91, which may be disposed on both ends of the cylinder. As clearly shown in FIG. 6, each end cap 91 has a reduced annular portion 92 to fit within the cylinder 86. The end cap 91, as shown in FIG. 7, may have two finger grips 94 disposed on opposite ends and extending as far as a desoldering braid spool 93. The braid spool 93 is commercially available and consists of a wick or braid to suck up liquid solder. Hence, the braid spools 93 may readily be removed by inserting the fingers in the finger grips 94.

The housing 14 may, for example, consist of a polycarbonate and the housing front portion 15 of a phenolic resin. The locking element 27 may consist of an acetal, known in the trade as Delrin, while the support 11 may be made of an acrilonitrile butadiene styrene (ABS). The cylinder 86 may, for example, consist of a clear plastic such as polycarbonate, and the end caps 91 of ABS.

It is also feasible to utilize solder strand spool 90 separately from the remainder of the tool holder. The solder strand spool 90 is surrounded by a cylinder 86' which engages a reduced annular portion 92' of a top and bottom end cap 91'. To this end, one of the end caps 91' may rest on a post 97 secured to a work bench 95 by a double-backed adhesive tape 96. This will allow the bottom end cap 91 to rotate. Alternatively, a well nut may be used. Furthermore, the structure of FIG. 8 may be provided with a central shaft 100 having an enlarged lower portion 101. The shaft 100 extends beyond the cylinder 86 and may be used for cocking a hand-held desoldering instrument of the type disclosed and claimed in applicant's copending application Ser. No. 223,499, filed on Jan. 8, 1981.

Figure 8:
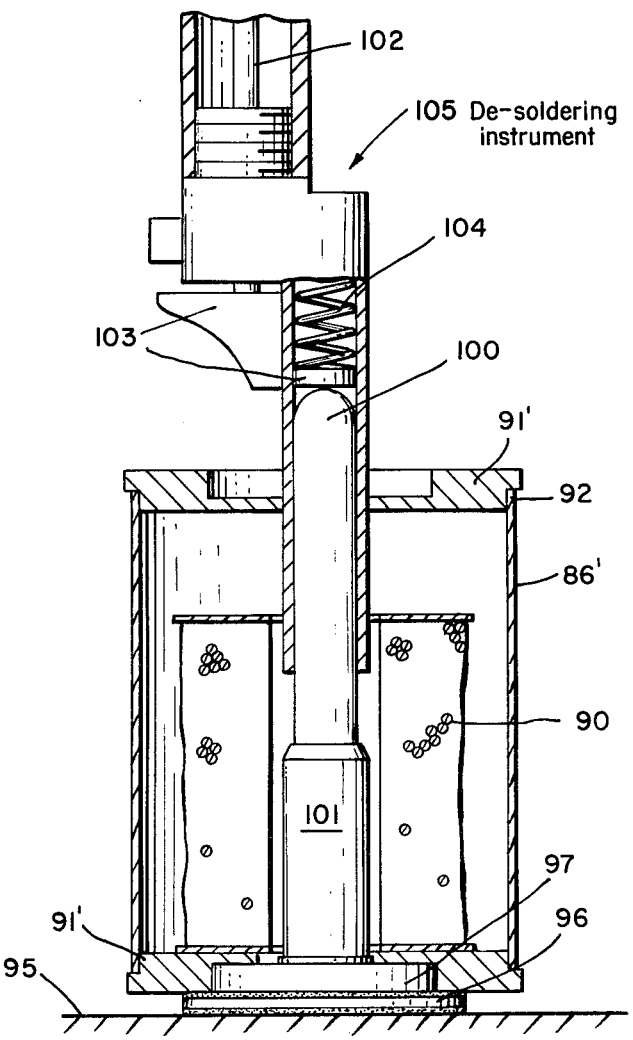
FIG. 8 is a side elevational view partly in cross section of the spool holder and solder spool, and including a central shaft disposed for cocking a desoldering instrument.

As shown in FIG. 8, this instrument, generally identified by 105, includes a piston-cocking shaft 102 which may be hand-cocked by an end cap 103 and which works against a spring 104. Hence, instead of hand-cocking the instrument, it is simply pushed against the shaft 100 to cock the soldering instrument.

The shaft 100 may, for example, consist of an acetal (Delrin).

There has thus been disclosed a holder for a soldering instrument. In the case of a temperature-controlled soldering instrument, the holder is energy-saving, due to its heat-reflecting cone which reflects radiant energy from the hot soldering tip. This in turn will equalize the temperatures, prevent hot spots and make the housing cool to the touch. Furthermore, the air in the tool holder may be evacuated, thus to minimize heat conduction. The instrument is locked in its tool pod but may readily be removed, unless the locking element is, in turn, locked. The support for the tool pod will also house a solder strand in a special cylinder and feed out a small portion of the solder at a time, the solder being wrapped around a storage post. A removable sponge tray is disclosed. The solder spool holder may be provided with a central shaft, secured to a work bench and used for cocking a hand-held desoldering instrument.

What is claimed is:

1. A holder for an electronically temperature controlled electric soldering instrument of the character including a handle portion having an enlarged diameter shoulder about the periphery of its forward end and a working shaft extending axially forwardly therefrom and terminating in a heated tip element, said holder comprising:
   (a) a hollow housing having a forward end adapted to sealingly engage the shoulder of an instrument, the forward end of said housing being disposed higher than its rearward end;
   (b) a hollow cone having of heat-reflecting inner surface disposed in said housing adapted to receive the working shaft and tip element of the instrument, the forward end of said housing having means for holding the instrument downwardly and at an angle with respect to the central axis of said housing and cone;
   (c) releasable locking means for retaining said shaft and tip element within said housing and being pivoted to the forward end of said housing and biased into its locked position, said releasable locking means having a forward portion for causing the shoulder of the instrument to push said releasable locking means into its unlocked position to permit entry of the instrument, and having a finger actuable portion for similarly unlocking said locking means and releasing the instrument when the instrument is held by the operator at its portion adjacent the shoulder thereof; and
   (d) means disposed on top of said housing for securing thereto another tool.

2. A holder as defined in claim 1 wherein said means secured to said housing is a male dovetail.

3. A holder for an electronically temperature controlled electric soldering instrument of the character including a handle portion having an enlarged diameter shoulder about the periphery of its forward end and a working shaft extending axially forwardly therefrom and terminating in a heated tip element, said holder comprising:
- (a) a hollow housing having a forward end adapted to sealingly engage the shoulder of an instrument, the forward end of said housing being disposed higher than its rearward end;
- (b) a hollow cone of having heat-reflecting inner surface disposed in said housing adapted to receive the working shaft and tip element of the instrument, the forward end of said housing having means for holding the instrument downwardly and at an angle with respect to the central axis of said housing and cone;
- (c) releasable locking means for retaining said shaft and tip element within said housing and being pivoted to the forward end of said housing and biased into its locked position, said releasable locking means having a forward portion for causing the shoulder of the instrument to push said releasable locking means into its unlocked position to permit entry of the instrument, and having a finger actuable portion for similarly unlocking said locking means and releasing the instrument when the instrument is held by the operator at its portion adjacent the shoulder thereof;
- (d) supporting means connected to said housing for supporting it at a downward angle with the front end thereof being higher than the rear; and
- (e) sponge tray and means for releasably securing it to a side of said support means, said sponge tray being provided with a low input nipple for supplying water thereto and a relatively high output nipple for removing the water.

4. A holder for an electronically temperature controlled electric soldering instrument of the character including a handle portion having an enlarged diameter shoulder about the periphery of its forward end and a working shaft extending axially forwardly therefrom and terminating in a heated tip element, said holder comprising:
- (a) a hollow housing having a forward end adapted to sealingly engage the shoulder of an instrument, the forward end of said housing being disposed higher than its rearward end;
- (b) a hollow cone having heat-reflecting inner surface disposed in said housing adapted to receive the working shaft and tip element of the instrument, the forward end of said housing having means for holding the instrument downwardly and at an angle with respect to the central axis of said housing and cone;
- (c) releasable locking means for retaining said shaft and tip element within said housing and being pivoted to the forward end of said housing and biased into its locked position, said releasable locking means having a forward portion for cuasing the shoulder of the instrument to push said releasable locking means into its unlocked position to permit entry of the instrument, and having a finger actuable portion for similarly unlocking said locking means and releasing the instrument when the instrument is held by the operator at its portion adjacent the shoulder thereof; and
- (d) supporting means connected to said housing for supporting it at a downward angle with the front end thereof being higher than the rear and further including a solder strand support including a substantially circular rib and a slotted cylinder having open ends and outer central recess to engage said rib.

5. A holder as defined in claim 4 wherein a solder spool and solder are disposed in said slotted cylinder.

6. A holder as defined in claim 5 which further includes a solder wick spool and means for holding it to the open ends of said slotted cylinder.

7. A holder as defined in claim 6 wherein said means for holding said solder wick spool includes an end cap, said end cap having two finger grooves extending beyond said solder wick spool for readily removing the solder wick spool, said end caps expanding said cylinder so as to fit snugly into said rib.

* * * * *